May 27, 1924.                                                1,495,330
J. KIRKLAND
REVOLVING LIFE GUARD
Original Filed May 9, 1921

Inventor
James Kirkland
By Attorney

Patented May 27, 1924.

1,495,330

UNITED STATES PATENT OFFICE.

JAMES KIRKLAND, OF LIVERPOOL, ENGLAND.

REVOLVING LIFE GUARD.

Application filed May 9, 1921, Serial No. 467,881. Renewed February 27, 1924.

*To all whom it may concern:*

Be it known that I, JAMES KIRKLAND, a subject of the King of England, and resident of Liverpool, England, have invented new and useful Improvements in Revolving Life Guards, of which the following is a specification.

This invention relates to improvements in revolving life guards and its principal object is to provide a device which may be readily attached to motor vehicles, trolley cars, trains and the like, so that when an object is encountered it will be swept up and prevented from falling beneath the car and becoming injured.

Another object of the invention resides in the provision of a grooved roller yieldably supported out of contact with the wheels in such a manner that when an object is encountered it will be forced into contact with the wheels and will be rotated thereby.

Figure 1:
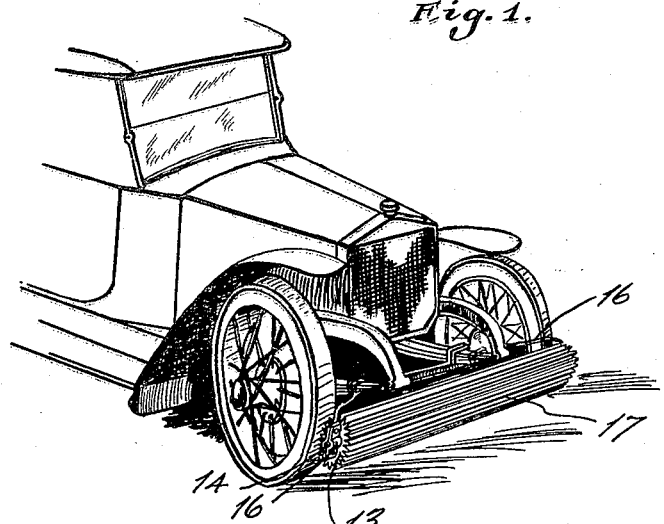
Figure 2:
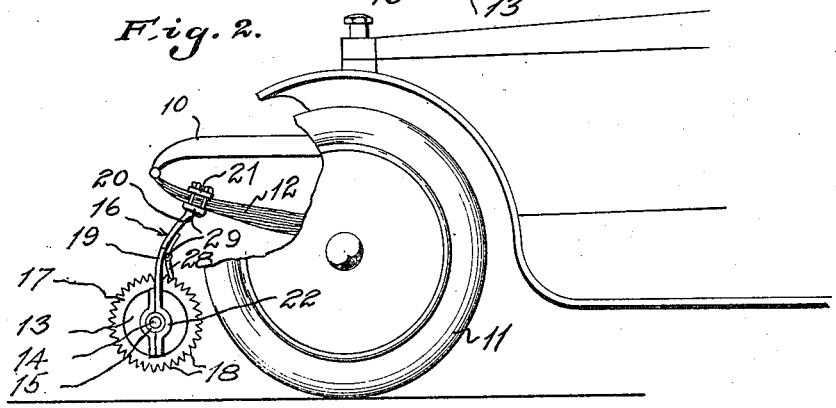
Figure 3:
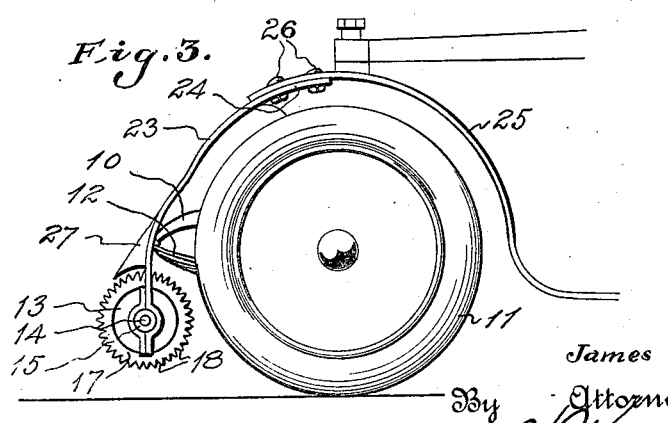

With these and other objects in view the invention consists in the novel construction, combination and arrangement of parts which will be fully set forth in the following specifications, claimed and illustrated in the accompanying drawings, in which, Figure 1 is a perspective view showing this device supported at the forward end of a motor vehicle, Figure 2 is a side view of one of the front wheels of a vehicle showing this improved life guard associated therewith, and Figure 3 is a view similar to Figure 2, showing a modified type of supporting means.

Referring to the drawings in detail, the numeral 10 designates the chassis of the vehicle which is supported on the usual wheels 11 by the usual springs 12 of any preferred type.

My improved life guard or fender, comprises a roller 13 having extending longitudinally therethrough a shaft 14, the ends of which are journalled in bushings 15 supported in the brackets designated generically by the numeral 16. A casing 17 of a suitable yieldable material such as rubber, incloses the roller and is provided on its exterior with an annular series of longitudinal grooves forming teeth 18 which engage and hold the object encountered and improve the frictional contact between the roller 17 and wheels 11.

The brackets above referred to each comprises a yielding arm 19, having clamp plates 20 and 21 at its upper end and a suitable bushing supporting socket 22 at its lower end. As shown in the drawings Figures 1 and 2, the arms 19 are secured to the springs 12 and consequently must be provided with various offset portions in order that the sockets 22 may be in a position to receive the ends of the shaft 14.

In the modified form of the invention illustrated in Figure 3, the guard roller is hung on the spring arms 23, the upper ends of which are curved as at 24 to coincide with the curvature of the fenders or mud guards 25 of the vehicle and are attached to said fenders by suitable securing means such as bolts 26. A shield 27 is arranged intermediate the ends of each arm 23 and partly overhangs the roller as shown. It is to be understood that if so desired, a pawl 28 may be pivoted as at 29 to the under side of each bracket in such a position that its free end will engage the teeth 18 and prevent the roller from revolving in a reverse direction.

In use it will be seen that when the roller encounters an object it will move rearwardly so as to contact with the wheels 11 of the vehicle and will be rotated in such a manner that the object will be raised clear of the surface traversed and carried along on the front of the vehicle until the same can be brought to a stop. Obviously serious injury is thereby avoided and the use of such a device will greatly reduce loss of life.

While in the foregoing there has been shown and described the preferred embodiment of this invention, it is to be understood that certain minor changes, in the details of construction, combination and arrangement of parts may be resorted to without departing from the spirit and scope of the invention as claimed.

What is claimed is:—

1. A rotary life guard comprising, the combination with a vehicle, of a roller having longitudinal grooves in its surface, resilient arms supporting said roller slightly in advance of the front wheels of the vehicle in such a manner that when an object is encountered the same will be elevated, and means to prevent the roller from rotating in a reverse direction.

2. A rotary life guard comprising, the combination with a vehicle, of resilient arms attached to the vehicle and projecting downwardly and outwardly to a point near the surface traversed, bearing bushings supported at the lower ends of the arms, a shaft journalled in said bushings, a roller on the shaft, a longitudinally grooved yieldable casing for the roller and means to prevent rotation of the roller in one direction.

Signed at New York, in the county and State of New York, this 5th day of May, 1921.

JAMES KIRKLAND